United States Patent [19]

Cerceau

[11] Patent Number: 4,798,026

[45] Date of Patent: Jan. 17, 1989

[54] THERMOSTABLE ABRASIVE DIAMOND-CONTAINING PRODUCT

[75] Inventor: Jean-Michel Cerceau, Seyssinet, France

[73] Assignee: Societe Industrielle de Combustible Nucleaire, Annecy, France

[21] Appl. No.: 50,027

[22] Filed: May 15, 1987

[30] Foreign Application Priority Data

May 16, 1986 [FR] France .................. 86 07069

[51] Int. Cl.⁴ .............................................. B24D 3/10
[52] U.S. Cl. ........................................ 51/204; 51/307; 51/309
[58] Field of Search ............... 51/204, 206 R, 209 R, 51/307, 308, 309

[56] References Cited

U.S. PATENT DOCUMENTS

| 4,231,195 | 11/1980 | DeVries et al. ............ 51/308 X |
| 4,380,471 | 4/1983 | Lee et al. ................... 51/307 X |
| 4,457,765 | 7/1984 | Wilson ...................... 51/209 RX |
| 4,534,773 | 8/1985 | Phaal et al. ................ 51/308 X |
| 4,610,699 | 9/1986 | Yazu et al. ................. 51/309 |
| 4,694,918 | 9/1987 | Hall ............................ 51/309 X |

*Primary Examiner*—Robert P. Olszewski
*Attorney, Agent, or Firm*—Fleit, Jacobson, Cohn & Price

[57] ABSTRACT

A thermostable abrasive diamond product includes a compact formed of diamond grains representing more than 80% by volume of the compact, each grain being bonded directly to its neighbors so as to form a polycrystalline structure. The empty spaces between diamond grains are occupied by a binder face containing silicon and/or titanium and nickel silicon (or titanium) and nickel being alloyed. The compact may be bonded by a metallurgical interface to a substrate of a refractory metal such as tungsten.

15 Claims, 1 Drawing Sheet

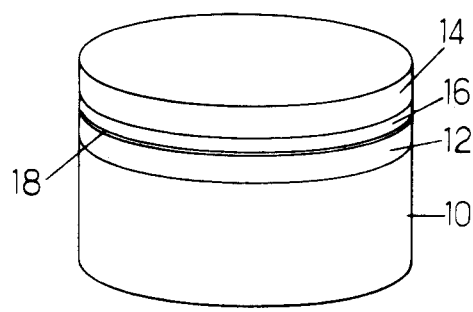
FIG. 1.
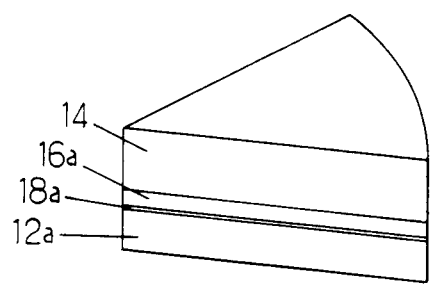
FIG. 2.
FIG. 3.
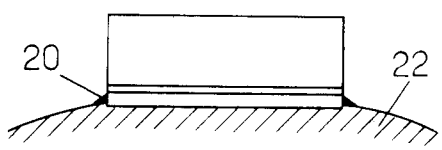
FIG. 4.
FIG. 5.
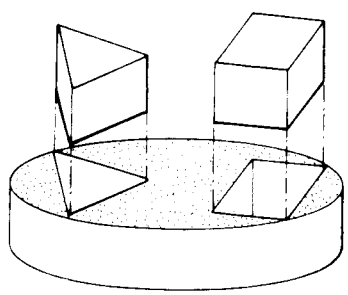
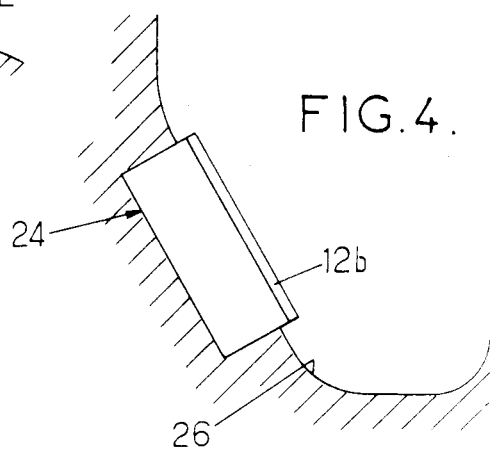

THERMOSTABLE ABRASIVE DIAMOND-CONTAINING PRODUCT

BACKGROUND OF THE INVENTION

1. Technical Field

The invention relates to abrasive products of the type having an active part consisting of a "compact" containing diamond grains or particles in an amount of more than 80% by volume o the compact, each grain being directly bonded to its neighbours so as to form a polycrystalline structure. It further relates to compact type products consisting of a polycrystalline structure and of a hard and refractory support integral with the compact.

The work "compact" designates a sintered product formed by grains bonded together by bridges created by diffusion of material in plastic state. Such plastic phase sintering is obtained, with diamond grains, at pressures and temperatures of the same order of magnitude as the pressures and temperatures used for synthesis of the same grains, which may be reduced by adding well-known conversion catalysts to the starting products.

2. Prior Art

Products of the above-defined type are known (U.S. Pat. No. 3,239,921) which are obtained at a temperature which may exceed 1750° C., in which the voids of the compact are filled by conversion catalyst, such as Co, Va, Ti, Zr, Cr, Si. Products are also known in which a compact is directly bonded to a metal carbide support (tungsten carbide in general). These products have the drawback of being rapidly degraded either when sintering was carried out without a sufficient amount of diamond particles, or when the active part is heated to a temperature exceeding about 700° C., due to the stresses induced in the metal matrix by thermal expansion of the matrix and due to the tendency of the diamond in contact with catalyst to graphitise when heated to a high temperature without at the same time being subjected to a high pressure.

The resistance of the compact at high temperature may be improved by removing the catalyst using the leaching method described in U.S. Pat. No. 3,745,623 (Wentorf) but the residual compact is porous and has a very large spedific surface, so that the life duration of the compact is reduced due to oxidation when it is brought to a high temperature.

Abrasive products have also been proposed including a silicon carbide support and a polycrystaline diamond compact, which is not in sintered condition since it was not subjected during manufacture to pressures and temperatures sufficent to cause mutual intergrowth of the diamond particles, in which the voids between grains of the composite contain a compound of silicon and a metal such as nickel (U.S. Pat. No. 4,241,135 to Lee et al). A drawback of such products is insufficient abrasion resistance, due to the lack of sintering.

A composite abrasive product has further been proposed (U.S. Pat. No. 4,124,401) which comprises: a mass of polycrystalline diamond cemented by a silicon-containing binder; and a carbide support whose cohesion is obtained with cobalt. The lack of catalyst and sintering during manufacture of the diamond mass prevents the formation of direct bridges between the diamond grains. What is obtained is not a sintered compact having a skeleton of great rigidity but rather a product which may be regarded as cemented by the binder.

U.S. Pat. No. 4,380,471 describes abrasive products comprising a cobalt-bonded tungsten carbide substrate, a barrier preventing migration of cobalt into diamond and a polycrystalline diamond composite having a silicon-Rhenium binder. Sintering of that product is not complete although the components are subjected to high temperatures and pressures during manufacture since they are not applied during a time sufficient for the binding phase to play a function other than filling the voids. Consequently, the product isnot adapted to resist abrasion.

The same comments are applicable to compacts manufactured by directly sintering diamond particles with silicon and nickel only (European No. 116,403). The failure to adequately support abrasion is probably caused by an insufficient "wettability" of the catalyst which is used. Wettability of the catalyst is a parameter which directly affects the reactivity of the latter in respect of the diamond particles. Insufficient wettability may be due to a melting point which is not low enough. Then, under the usual sintering temperature and pressure conditions, bridging occurs to an extent which isnot sufficient for the body to resist during machining. Another drawback of the last-mentioned compact is that, although it is sintered and it is thermostable, it cannot be brazed due to the lack of support and consequently its field of use is restricted. A number of abrasive compacts obtained by sintering diamond particles in presence of a hard thermostable substance which is not diamond have also been proposed. Among such substances, as defined for instance in French 2,043,350, boron, titanium, silicium and their compounds have been used and represent a substantial improvement. However, bridging often remains insufficient for a satisfactory resistance to shocks and abrasion.

From the above review of prior art products, it appears tha there is no existing abrasive compact or composite, with or without a support, which exhibits all thermostability, abrasion resistance and shock resistance, which are now required from abrasive products.

It is an object of the invention to provide a thermostable diamond abrasive product which is improved as comared with the existing products, particularly in that it includes a compact in which diamond grains are directly bonded by bridbes, which has a low specific surface, is resistant to shock and abrasion and can be brazed.

For that purpose, there is provided a product of the above-defined type, wherein the porosity or voids between diamond grains are filled with a binder phase which contains, on the one hand, silicon or titanium and, on the other hand, nickel (if titanium is used) or iron-alloyed nickel. Silicon or titanium forms a hard thermostable ceramic phase at the surface of the diamond particles.

In an advantageous embodiment, the compact is bonded by a metallurgical interface to a refractory metal substrate.

The diamond grains represent 80% to 95% by volume of the compact, advantageously 80 to 90%. The mutual proportions by weight of titanium and Fe-Ni in the binder phase are advantageously in a ratio between 40/60 and 90/10.

The substrate of refractory metal (typically tungsten or molybdenum) may be carried by a tungsten carbide or ceramic material support. A diffusion barrier may be placed between the metal substrate and the compact so as to accomodate the stresses induced between the compact and suppot by the shrinkage during sintering of the diamond grains. The barrier participates in the metallurgical bond, may be very thin and is formed of diamond and of tungsten carbide powder.

A thin nickel layer, obtained by coating the metal substrate, also participates in the intermetallic bond and forms an additional source of catalyst.

In practice, the metal substrate, if provided, will typically be of from some tenths of millimeter to some millimeters. A thickness of 0.25 mm is frequently satisfactory.

There is also provided a method of manufacturing such an abrasive product including the steps of: placing a layer of diamond powder with nickel and iron powder on a refractory metal substrate which is in contact with a tungsten carbide support; placing on said layer a disk or a fine layer of either silicon or nickel-titanium powder; placing a cell containing the so-built stack in a press at a temperature exceeding 1200° C. under a pressure exceeding 45 kbars, the pressure and temperature being chosen so as to correspond to the zone of stability of diamond; and maintaining the temperature and pressure of the cell for a time sufficient for causing mutual plastic phase sintering of the diamond grains.

The invention will be better understood from the following description of particular embodiments, given by way of examples. The description refers to the accompanying drawings.

SHORT DESCRIPTION OF THE DRAWINGS

FIG. 1 shows the general construction of a first abrasive product of the invention, the scale not being respected for clarity;

FIG. 2 shows a composite product which is a modification ofthat of FIG. 1;

FIGS. 3 and 4 are simplified diagrams showing respectively hwo an abrasive product without carbide support may be mounted on a tool and how a tool may be manufactured by molding the body on abrasive products; and FIG. 5 indicates how abrasive bodies may be cut out in a compact of the invention.

DETAILED DESCRIPTION OF PREFERRED EMBODIMENTS

The product shown in FIG. 1 includes a support 10 of sintered refractory carbide containing cobalt as sintering binder. The support 10, whose thickness may depend on the application contemplated, is bonded to a substrate 12 of refractory metal which will generally be metal tungsten or molybdenum. Substrate 12 is bonded to a polycrystalline diamond compact 14 by a metallurgical bond which may contain a metal substrate 12 which is nickel-coated on one or both surfaces 18 and a diffusion barrier 16 containing diamond and tungsten carbide.

The compact 14 includes 80 to 95% by volume of diamond grains mutually bonded directly by bridges and thus forming an abrasive part. The empty spaces in the diamond are occupied by a binder phase substantially free of cobalt and which essentially includes, in an advantageous embodiment, compounds resulting from high pressure high temperature transformation of silicon and nickel-iron in the presence of diamond particles.

The simultaneous presence of such elements, which are essentially present as alloys (the term "alloy" being understood in a wide sense as designating any solid solution or combination of two elements one at least of which is a metal) results in properties which are very different from those obtained with one metal only.

It seems that the silicon present in the intergranular matrix is combined in two forms which are in greater or smaller proportions depending on the surface of the diamond grains left free after formation of the bridges. Silicon, very reactive with respect to carbon at the pressures and temperatures required for sintering by viscous flow, will form a ceramic phase of the silicon carbide type at the surface of the diamond grains. Iron and nickel do not remain in metal form but react with silicon and a low diamond fraction to form intermediary products.

Iron in combination with nickel results into an alloy having a low melting point and improves the wettability. The increased wettability results in an increased catalytic effect, i.e. an increased reactivity with respect to carbon at the processing temperature and pressure.

For the same sintering temperature, an alloy is obtained whose wettability is better than that of nickel alone and which results into improved mutual bridging of the diamond particles. Another advantage is that carbon-containing phases corresponding to the formula $Fe_x Si_y C_z$ are generated which increase the hardness.

As to silicon, it provides thermostability.

If titanium is selected for constituting the element which hardens the intergranular matrix, then nickel appreciable lowers the melting point and enhances diffusion between the diamond particles. The formation of titanium carbide is accompanied, when the titanium is in oversaturated condition, by the formation and precipitation on cooling of a compound of the $Ti_x Ni_y$ type whose stoechiometric formula and amount depend on the relative concentrations of nickel and residual titanium. The reverse catalysis effect which nickel presents in the metal state is then eliminated due to its combination with titanium.

The above results are particularly reached with a composition in which the proportions by weight of silicon and iron-nickel are in a ratio of from 40/60 to 90/10 (typically 40/60 to 80/20) or the proportions of titanium and nickel are in a ratio of from 40/60 to 80/20.

The iron-nickel ratio will preferably be comprised between 95/5 and 30/70 by weight and will typically be of from 60/40 to 40/60.

The product shown in FIG. 1 may be manufactured as follows: the tunsten carbide support 10, then the substrate 12 (formed by a tungsten disk 0.25 mm thick) are placed successively in a reaction cell. An electrochemically deposited nickel layer of small thickness promotes the metallurigical connection between the tungsten substrate and carbide support.

On the disk is placed a thin layer (0.25 mm for example) of a powder mixture intended to provide a diffusion barrier, formed of tungsten carbide and diamond. The diamond content of this layer may particularly be between 30 and 70% by volume.

The nickel on the substrate is provided for diffusion towards a powder mass intended to form the compact during the stay in the heating press. The powder mass, placed on the diffusion barrier, is formed of diamond grains whose grain size is chosen depending on the contemplated application of the product. The powder mixture can be mixed with iron-nickel powder. The grain size will generally be larger for drilling products than for machining products; for example, for metal machining products, a diamond powder may be used whose mean grain size is between 0 and 30 μm and for drilling products a mean grain size of 20 to 100 μm.

In a modified embodiment, the amount of Fe-Ni is delivered by a solid disk or a layer of powdered metal on the diamond.

Finally, a film of silicon or titanium-nickel in powder form or in the form of a solid disk (monocrystalline silicon, pre-reacted metal disk of nickel-titanium, ...) is located on the stack and is intended to diffuse into the diamond in proper proportion and to combine at least partially with iron and nickel which are already present when mixed to the diamond powder or which infiltrate through the diamond from the iron-nickel delivery layer.

The cell is then closed with a lid and placed in a press which may be one of the known types (belt press, tetrahedric press or hexahedric press). The assembly is brought to a pressure exceeding 45 kbars, then heated to a temperature which will usually be between 1200° and 1300° C. for the time required for causing the formation of a polycrystalline diamond skeleton. The temperature is then allowed to drop, the press is opened and a product is obtained which may then be shaped before use.

In this product, the compact contains a diamond skeleton whose pores are filled with an homogeneous thermostable hard ceramic phase consisting of:
 silicon, allied to iron and nickel,
 silicon carbide and iron silicon carbide,
 (or nickel allied titanium and titanium carbide, depending upon the element which was selected),
 phases obtained at high temperature, which could not be exactly determined from spectrographic analysis.

The resulting product is thermostable. The risks of stripping or bending during temperature variations, particularly during machining, are reduced due to the low thermal expansion coefficient of the matrix and to the protection provided by the ceramic phase at the surface of the grains.

In a first modification, the tungsten carbide support is replaced with a ceramic support of another material, such as silicon carbide, which is later removed, for instance by chemical attack. That solution has the advantage of providing a low thickness abrasive product which may be brazed on a steel tool. For that purpose, it is sufficient that the tungsten layer be 0.25 mm thick.

In another modification, the nickel-coated tungsten substrate is separated from the tungsten carbide support by one or a plurality of zirconia disks. Then, that part which is carried by tungsten and the tungsten carbide part may be separated, on the product obtained after press processing, in a bath of hot hydrofluoric acid. The product obtained is then a thermostable diamond compact on a thin tungsten support which may be used as a brazable tool for cutting metals or drilling rocks.

In yet another modification, shown in FIG. 2, the abrasive product is directly formed by stacking a tungsten or molybdenum support 12a having a surface coating 18a of nickel, a diffusion barrier 16a and a diamond compact 14. The abrasive product may be directly molded in final form but, more frequently, it will be obtained by laser cutting a cylindrical blank.

A product as shown in FIG. 2 may be used by clamping it on a tool, or, as shown schematically in FIG. 3, it may be brazed at 20 to a tool body 22, made for example of steel.

Yet another solution consists in placing oabrasive products with a tungsten or molybdenum substrate or with a compact which contains iron-nickel and silicon in a mold which then serves for forming a cutting head, for example an oil drilling head, by infiltration using techniques which are well known for manufacture of diamond products at a temperature close to 1200° C. FIG. 4 shows such a product 24 having a W or Mo-substrate, engaged into a pocket provided for this purpose in the internal wall of an infiltration mold 26.

It is also possible to manufacture abrasive products without substrate or support. Then shaped tool elements can be obtained form the product by laser cutting, as indicated on FIG. 5.

Some specific examples will now be given, it being understood that they are for illustration only.

EXAMPLE 1

A mass of diamond particles ranging in size from about 10 μm to about 60 μm was mixed to a mixture of nickel and iron containing 50% by weight of iron. The total amount of Fe-Ni was about 3.2% by weight of the diamond-nickel-iron mixture. A silicon disk 0.25 mm thick was placed on the bottom of a molybdenum cup, then an amount of diamond Fe-Ni mixture selected for representing five times the weight of the silicon disk was located above the disk.

A diffusion barrier containing 50% by volume of tungsten carbide particles and 50% by volume of diamond grains of a size equivalent to that used for forming the preceding active layer is placed on the diamond layer. The whole is then covered with a tungsten disk 0.25 mm thick plated with a fine nickel layer on both faces and fitting the inner diameter of the molybdenum cup. The later is crimped on a tungsten carbide support so that the support is in contact with the tungsten disk and forms a compact assembly which is then placed in a pressure and temperature transmission cell.

The cell is subjected, through the six anvils of a cubic press, to a pressure of about 60 000 bars and a temperature of about 1500° C. for a thermal cycle of about 3 minutes. The product obtained is then shaped by grinding to size so as to obtain a cylinder. The noninfiltrated silicium is removed during such a finishing step.

The product was then evaluated on a lathe as a tool for dry turning a block of granite under the following conditions:

| Cutting speed: | 330 m/mn |
|---|---|
| Depth of cut: | 0.5 mm |
| Feed per revolution: | 0.7 mm |

A commercially available product (including cobalt as a catalyst and supported by a disk of tungsten carbide) was tested under the same conditions. The wear rate was approximately twice that of the product of the invention. As an indication, under the above-identified severe machining conditions, the product exhibited, after removing a granite volume of 430 cm$^3$, an amount of wear of 0.35 mm while the corresponding wear of the commercially available product was 0.7 mm.

For evaluating the resistance to thermal effects, the same product was placed in an oven at 700° C. in a reducing atmosphere and subjected to a temperature cycle lasting 5 hours, including a temperature rise from 700° to 1200° C. for 1h30, slow cooling to 700° C. and air quenching.

After the treatment, the tool had the same machining performances as those measured previously. On the other hand, the commercially available product did not accept a cycle with a maximum temperature higher than 750° C.

EXAMPLE 1BIS

The procedure used in this Example was the same as that setforth in Example 1, except that the layer of Fe-Ni mixed diamond was substituted with a layer of diamond powder covered with a solid or powdered layer of Fe-Ni. The same proportion of 3.2% between the catalyst and the diamond was retained. Examination of the product indicated that it is equivalent to that of Example 1.

EXAMPLE 2

The same procedure as in Example 1 was used. However, the mixture was prepared from:
96.8% by weight of diamond particles,
3.2 by weight of a powder mixture containing 50% by weight of iron and 50% by weight of nickel.

The mixture was placed on a silicon disk representing 10% of the weight of the mixture in a molybdenum cup. The cell was subjected to the same temperature and pressure cycles as in Example 1.

The obtained product was again subjected to wear tests and shock-resistance tests.

Under test conditions identical to those of Example 1, however, with the following parameters:

| Cutting depth: | 0.25 mm |
|---|---|
| Machine out volume: | 220 cm$^3$ | the abrasive product according to the invention had an amount of wear of 0.28 mm while a commercially available abrasive product (containing a silicon binder) had a corresponding amount of wear of about 0.46 mm.

EXAMPLE 3

The same procedure as in Example 2 was carried out. However, the single disk of silicon was replaced with two disks each 0.25 mm thick, located on both sizes of the diamond-iron nickel mixture.

The test results were very similar to those of Example 2.

EXAMPLE 4

A mass of diamond particles ranging in size from 10 to 60 μm is mixed with 3.2% of nickel and iron by weight. Nickel and iron were in the form of a powder mixture with a Fe-Ni ratio of 60/40 by weight.

A silicon disk 0.25 mm thick was located on the bottom of a molybdenum cup. Then, nickel-iron diamond mixture was located on the disk in such an amount that the disk represented 15% by weight of the powder.

A diffusion barrier containing 50% by volume of tungsten carbide particles and 50% by volume of diamond grains of a size equivalent to that used for forming the preceding active layer is placed on the diamond layer. The whole is then covered with a molybdenum disk 0.25 mm thick plated with a nickel layer some μm thick on both faces and fitting the inner diameter of the molybdenum cup. The cup is crimped on a suppport of tungsten carbide so that it is in contact with the molybdenum disk and constitutes a tightly clamped assembly which is then placed in a pressure and temperature transmission cell.

The cell is subjected to the same pressure and temperature cycle as in Example 1.

The test results were very similar to those of the preceding Examples.

EXAMPLE 5

An amount of diamond grains whose grain size distribution is between 0 and 20 μm is intimately mixed with 4.1% by weight of iron-nickel. At the bottom of a molybdenum cup is placed a silicon disk 0.25 mm thick representing 15% by weight of the diamond mass with which it is later covered. A diffusion barrier containing 50% by volume of tungsten carbide particles and 50% by volume of diamond particles having the same size as for the active layer is placed on the diamond layer. The assembly is recovered with a tungsten disk 0.25 mm thick plated with a thin nickel coating on that face which is in contact with the diffusion barrier and fitting the inner diameter of the molybdenum cup. Then three zirconium disks each having a thickness of the order of 10th of a millimeter are stacked on the tungsten disk and they ar covered with a tungsten carbide support. The compact assembly thus formed in placed in a pressure and temperature transmission cell.

This cell is subjected to the same pressure and temperature cycle as the cell in the above Examples.

A cylinder obtained by grinding is placed in a hot hydrofluoric acid bath for a few minutes for dissolving the zirconium disks and thus separating the carbide support from the active layer fixed to the tungsten substrate. The tungsten substrate may then be lapped so as to obtain a flat brazing support. Standardized shapes may be obtained by cutting out with a focused laser beam, then brazed at high temperature to tool bodies so as to obtain a bond with high mechanical strength.

EXAMPLE 6

The same procedure as in Example 1 was used, except that silicon was substituted with titanium-nickel and the Ni-Fe mixture was substituted with nickel powder. Nickel represented 2.9% by weight of the diamond-nickel mixture while titanium-nickel was brought as a metal disk 0.13 mm thick.

Similar results were again obtained.

I claim:
1. Abrasive product comprising a compact essentially consisting of diamond particles presention an amount of more than 80% by volume of the compact, each particle being directly bonded to its neighbors so as to form a polycrystalline structure, and a binder phase filling the voids between said diamond particles, said binder phase essentially consisting of silicon, iron and nickel in alloyed condition, wherein the amounts of nickel and iron in said binder phase are in a ratio of from 5/95 to 70/30 by weight.

2. Abrasive product according to claim 1, wherein said compact is bonded by a metallurigical interface to a refractory metal substrate.

3. Abrasive product according to claim 2, wherein the refractory metal is tungsten or molybdenum.

4. Abrasive product according to claim 1, wherein diamond represents 80% to 95% by volume of the compact.

5. Abrasive product according to claim 1, wherein silicon and iron-nickel in the binder phase are in a ratio Si/Ni-Fe of between 40/60 and 90/10 by weight.

6. Abrasive product according to claim 1, wherein said ratio is of from 40/60 to 60/40 by weight.

7. Abrasive product comprising:
a compact essentially consisting of diamond particles present in an amount of more than 80% by volume of the compact, each particle being directly bonded to its neighbors so as to from a polycrystalline structure, and a binder phase filling the voids between said diamond particles, said binder phase essentially consisting of
titanium and nickel, wherein titanium and nickel are present in the binder phase in a ratio of between 40/60 and 80/20 by weight,
and a refractory metal substrate having a metallurgical bond with said compact.

8. Abrasive product according to claim 7, further comprising a support of tungsten carbide or ceramic material bonded to said substrate.

9. Abrasive product according to claim 7, wherein titanium is present in said binder phase as titanium carbide and as $Ti_xNi_y$, and nickel is essentially present in combination with titanium.

10. Abrasive product comprising:
a compact essentially consisting of diamond particles present in an amount of more than 80% by volume of the compact, each particle being directly bonded to its neighbors so as to form a polycrystalline structure, and a binder phase filling the voids between said diamond particles, said binder phase essentially consisting of at least one of the alloys selected from:
silicon, iron and nickel,
and titantium and nickel,
and a refractory metal substrate having a metallurgical bond with said compact, wherein a face of said substrate in contact with the compact is nickel-plated and a diffusion barrier is placed between the nickel plated face of the substate and the compact.

11. Abrasive product according to claim 10, wherein the diffusion barrier consists of diamond and carbide powder and is devoid of cobalt.

12. A method of manufacturing an abrasive product including the steps of: placing a layer of diamond particles with nickel and iron powders on a refractory metal substrate which is in contact with a tungsten carbide support with nickel and iron being in a ratio of from 5/95 to 70/30 by weight; placing on said layer a disk or a fine layer of silicon powder to form a stack; placing a cell containing the stack in a press at a temperature exceeding 1200° C. under a pressure exceeding 45 kbars, the pressure and temperature being selected within the zone of stability of diamond; and maintaining the temperature and pressure of the cell for a time sufficient for causing mutual plastic deformation sintering and direct bonding of the diamond particles.

13. A method according to claim 12, further including the step of inserting at least one zirconium disk between said refractory metal substrate and said tungsten carbide support before said layer of diamond particles is placed on said refractory metal substrate and of separating the tungsten carbide support after said cell has been maintained at a temperature and pressure sufficient for causing mutual plastic deformation sintering.

14. A method of manufacturing an abrasive product, including the steps of: placing a titanium-nickel disk on the bottom of cell; placing a layer of a mixture of diamond particles and nickel powder on said disk; placing a diffusion barrier containing tungsten carbide particles and diamond particles on the diamondnickel layer; placing a nickel plated tungsten disk on said diffusion barrier; closing said cell; and placing said cell in a press at a temperature exceeding 1200° C. under a pressure exceeding 45 kbars, the pressure and temperature being selected within the zone of stability of diamond; and maintaining the temperature and pressure of the cell for a time sufficient for causing mutual plastic deformation sintering and direct bonding of the diamond particles, the quantities of diamond, nickel and titanium being so selected that the amounts of titanium and nickel in the binder phase in the compact resulting from said layer of diamond particles with nickel and titanium in a ratio of between 40/60 and 80/20 by weight.

15. Abrasive product comprising a compact essentially consisting of diamond particles present in an amount of from 80 to 95% by volume of the compact, each particle being directly bonded to its neighbors so as to form a polycrystalline structure, and a homogeneous thermostable hard ceramic binder phase filling the voids between said diamond particles, said binder phase essentially consisting of silicon allied to iron and nickel, silicon carbide and iron silicon carbide.

* * * * *